(12) United States Patent
Tang

(10) Patent No.: US 11,895,705 B2
(45) Date of Patent: Feb. 6, 2024

(54) COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 395 days.

(21) Appl. No.: 17/202,249

(22) Filed: Mar. 15, 2021

(65) Prior Publication Data

US 2021/0204330 A1     Jul. 1, 2021

Related U.S. Application Data

(63) Continuation of application No. PCT/CN2018/107732, filed on Sep. 26, 2018.

(51) Int. Cl.
    *H04L 29/08*     (2006.01)
    *H04L 12/745*     (2013.01)
    (Continued)

(52) U.S. Cl.
    CPC ....... *H04W 74/0833* (2013.01); *H04L 5/0098* (2013.01); *H04W 56/001* (2013.01);
    (Continued)

(58) Field of Classification Search
    CPC ......... H04W 72/0446; H04W 72/0453; H04W 74/006; H04W 74/0833; H04W 56/001; H04L 5/0098; H04L 5/0094; H04L 5/0053
    See application file for complete search history.

(56) References Cited

U.S. PATENT DOCUMENTS 9,900,912 B2 *   2/2018   Huang ............. H04W 56/0045
2014/0098761 A1    4/2014   Lee et al.
(Continued)

FOREIGN PATENT DOCUMENTS

CN     105407524 A     3/2016
CN     107809306 A     3/2018
(Continued)

OTHER PUBLICATIONS

Examination Report for Indian Application No. 202117017861 dated Feb. 10, 2022. 7 pages with English translation.
(Continued)

*Primary Examiner* — Brian D Nguyen
(74) *Attorney, Agent, or Firm* — Perkins Coie LLP

(57) ABSTRACT

The embodiments of the present application relate to a communication method, a terminal deice, and a network device. The method comprises: a terminal device acquires a target physical random access channel (PRACH) resource set, the target PRACH resource set comprising at least one resource set between a first PRACH resource set and a second PRACH resource set, the first PRACH resource set and the second PRACH resource set being different by at least one resource; and the terminal device determines a target PRACH resource in the target PRACH resource set, the target PRACH resource being used for PRACH transmission in a random access process. The communication method, the terminal device, and the network device of the embodiments of the present application allow the terminal device to access a network via an NR-U carrier.

18 Claims, 4 Drawing Sheets

(51) Int. Cl.
  *H04W 74/08* (2009.01)
  *H04L 5/00* (2006.01)
  *H04W 56/00* (2009.01)
  *H04W 72/0446* (2023.01)
  *H04W 72/0453* (2023.01)
  *H04W 74/00* (2009.01)

(52) U.S. Cl.
  CPC ... *H04W 72/0446* (2013.01); *H04W 72/0453* (2013.01); *H04W 74/006* (2013.01)

(56) References Cited

U.S. PATENT DOCUMENTS

| | | | |
|---|---|---|---|
| 2014/0126530 A1 | 5/2014 | Siomina et al. | |
| 2017/0295596 A1* | 10/2017 | Chen | H04L 5/0051 |
| 2019/0029019 A1* | 1/2019 | Zhang | H04L 5/0042 |
| 2019/0124682 A1* | 4/2019 | Takeda | H04W 74/08 |
| 2019/0159257 A1* | 5/2019 | Rico Alvarino | H04L 1/0003 |
| 2019/0223157 A1 | 7/2019 | Hwang et al. | |
| 2019/0349998 A1* | 11/2019 | Bhattad | H04W 72/1268 |
| 2021/0194562 A1* | 6/2021 | Chen | H04W 72/23 |

FOREIGN PATENT DOCUMENTS

| | | |
|---|---|---|
| WO | 2016086144 A1 | 6/2016 |
| WO | 2017222327 A1 | 12/2017 |

OTHER PUBLICATIONS

International Search Report dated Mar. 6, 2019 cited in PCT/CN2018/107732.

Extended European Search Report for European Application No. 18935978.9 dated Sep. 22, 2021. 10 pages.

\* cited by examiner

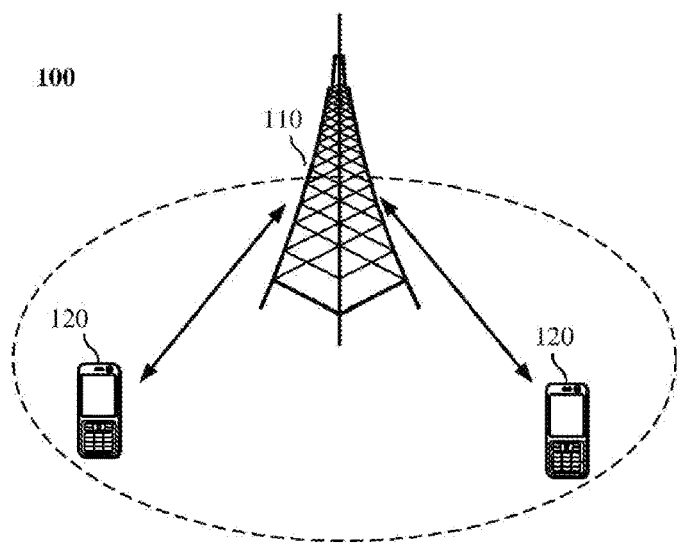

A terminal device acquires a target Physical Random Access Channel (PRACH) resource set, wherein the target PRACH resource set comprises at least one resource set of a first PRACH resource set and a second PRACH resource set, and at least one resource of the first PRACH resource set and at least one resource of the second PRACH resource set are different — 210

The terminal device determines a target PRACH resource from the target PRACH resource set, wherein the target PRACH resource is used for PRACH sending in a random access process — 220

FIG. 2

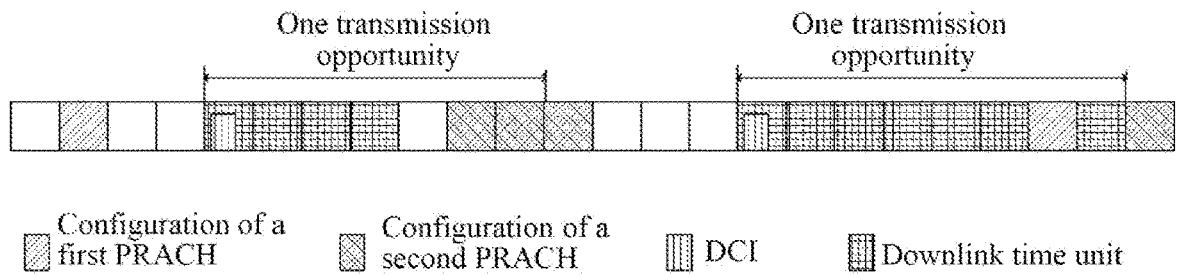

FIG. 3

COMMUNICATION METHOD, TERMINAL DEVICE, AND NETWORK DEVICE

CROSS-REFERENCE TO RELATED APPLICATIONS

The present application is a continuation application of International PCT Application No. PCT/CN2018/107732, having an international filing date of Sep. 26, 2018. The content of the above-identified application is hereby incorporated by reference.

TECHNICAL FIELD

The present application relates to the field of communications, specifically to a communication method, a terminal device and a network device.

BACKGROUND

Supporting a data transmission on an unlicensed spectrum in a New Radio (NR) system, when performing communication on the unlicensed spectrum, a communication device needs to follow a principle of Listen Before Talk (LBT), that is, before sending a signal on a channel of the unlicensed spectrum, the communication device needs to perform channel sensing (or referred to as channel detecting) first, and the communication device may send a signal only when a result of channel sensing is that the channel is idle. If the result of channel sensing by the communication device on the unlicensed spectrum is that the channel is busy, the communication device cannot send any signal.

For an NR-Based Access to Unlicensed Spectrum (NR-U) system that deploys a network on an unlicensed spectrum, it may support a scenario of independent network deployment. Therefore, how a terminal device accesses a network through an NR-U carrier is a problem to be solved urgently.

SUMMARY

Implementations of the present application provide a communication method, a terminal device and a network device, so that a terminal device may access a network through an NR-U carrier.

In a first aspect, a communication method is provided, including: acquiring, by a terminal device, a target Physical Random Access Channel (PRACH) resource set, wherein the target PRACH resource set includes at least one resource set of a first PRACH resource set and a second PRACH resource set, and at least one resource of the first PRACH resource set and at least one resource of the second PRACH resource set are different; and determining, by the terminal device, a target PRACH resource from the target PRACH resource set, wherein the target PRACH resource is used for PRACH sending in a random access procedure.

In a second aspect, a communication method is provided, including: determining, by a network device, a first PRACH resource set and a second PRACH resource set, wherein at least one resource of the first PRACH resource set and at least one resource of the second PRACH resource set are different; and detecting, by the network device, a random access preamble sequence on at least one first PRACH resource in the first PRACH resource set and at least one second PRACH resource in the second PRACH resource set.

In a third aspect, a terminal device is provided, configured to perform the method in the above first aspect or in each implementation thereof.

Specifically, the terminal device includes functional modules configured to perform the method in the above first aspect or in each implementation thereof.

In a fourth aspect, a network device is provided, configured to perform the method in the above second aspect or in each implementation thereof.

Specifically, the network device includes functional modules configured to perform the method in the above second aspect or in each implementation thereof.

In a fifth aspect, a terminal device is provided, including a processor and a memory, wherein the memory is configured to store a computer program, and the processor is configured to call and run the computer program stored in the memory to execute the method in the above first aspect or in each implementation thereof.

In a sixth aspect, a network device is provided, including a processor and a memory, wherein the memory is configured to store a computer program, and the processor is configured to call and run the computer program stored in the memory to execute the method in the above second aspect or in each implementation thereof.

In a seventh aspect, a chip is provided, configured to implement the method in any one of the above first to second aspects or in each implementation thereof.

Specifically, the chip includes: a processor, configured to call and run a computer program from a memory to cause a device in which the chip is installed to perform the method in any one of the above first to second aspects or in each implementation thereof.

In an eighth aspect, a computer-readable storage medium is provided, configured to store a computer program that causes a computer to perform the method in any one of the above first to second aspects or in each implementation thereof.

In a ninth aspect, a computer program product is provided, including computer program instructions that cause a computer to perform the method in any one of the above first to second aspects or in each implementation thereof.

In a tenth aspect, a computer program is provided, which, when being run on a computer, causes the computer to perform the method in any one of the above first to second aspects or in each implementation thereof.

According to the above technical solutions, a terminal device determines, from acquired at least one resource set, a target PRACH resource for transmitting a PRACH on an unlicensed spectrum, so that a transmission of a PRACH on an NR-U carrier may be realized.

BRIEF DESCRIPTION OF DRAWINGS

FIG. 1 is a schematic diagram of architecture of a communication system according to an implementation of the present application.

FIG. 2 is a schematic flow chart of a communication method according to an implementation of the present application.

FIG. 3 is a schematic diagram of a method for acquiring a PRACH resource set by a terminal device according to an implementation of the present application.

FIG. 5 is a schematic flow chart of a communication method according to an implementation of the present application.

DETAILED DESCRIPTION

Figure 4:
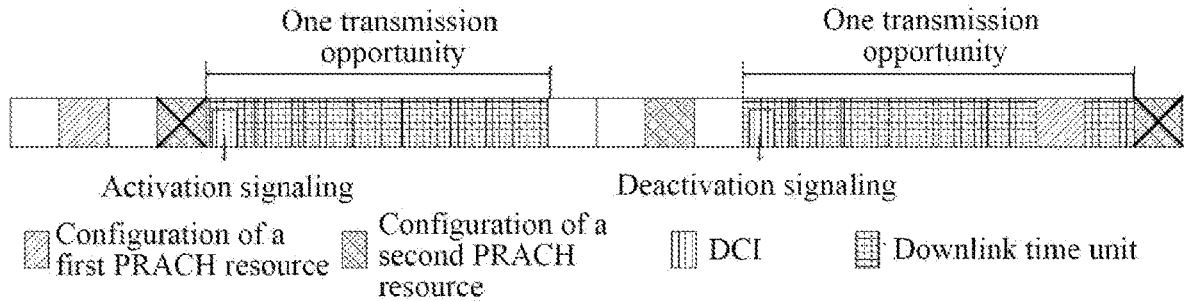
FIG. 4 is a schematic diagram of another method for acquiring a PRACH resource set by a terminal device according to an implementation of the present application.

Technical solutions in implementations of the present application will be described below with reference to drawings in implementations of the present application. It is apparent that the implementations described are just a part of implementations of the present application, but not all implementations of the present application. According to the implementations of the present application, all other implementations achieved by a person of ordinary skills in the art without paying an inventive effort belong to the protection scope of the present application.

Technical solutions of implementations of the present application may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD) system, an Advanced long term evolution (LTE-A) system, a New Radio (NR) system, an evolution system of an NR system, an LTE-based access to unlicensed spectrum (LTE-U) system, an NR-based access to unlicensed spectrum (NR-U) system, a Universal Mobile Telecommunication System (UMTS), a Worldwide Interoperability for Microwave Access (WiMAX) communication system, Wireless Local Area Networks (WLAN), Wireless Fidelity (WiFi), a next-generation communication system or another communication system, etc.

Illustratively, a communication system 100 applied in an implementation of the present application is as shown in FIG. 1. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or a CDMA system, a NodeB (NB) in a WCDMA system, an Evolutional Node B (eNB or eNodeB) in an LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router, or a 5G network, or a network device in a future evolved Public Land Mobile Network (PLMN), etc.

The communication system 100 also includes at least one terminal device 120 located within the coverage area of the network device 110. As used herein, the term "terminal device" includes, but is not limited to, an apparatus configured to receive/send a communication signal via a wired line, for example, via Public Switched Telephone Networks (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a DVB-H network, a satellite network, or an AM-FM broadcast sender; and/or another terminal device; and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communications System (PCS) terminal which may combine a cellular radio telephone and data processing, faxing, and data communication abilities, a PDA that may include a radio telephone, a pager, an Internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN, or the like.

Optionally, Device to Device (D2D) communication may be performed between the terminal devices 120.

Optionally, a 5G system or a 5G network may also be called a New Radio (NR) system or an NR network.

FIG. 1 shows one network device and two terminal devices as an example. Optionally, the communication system 100 may include multiple network devices, and another quantity of terminal devices may be included within a coverage area of each network device, and this is not limited in the implementations of the present application.

Optionally, the communication system 100 may further include another network entity such as a network controller, a mobile management entity, or the like, which is not limited in the implementations of the present application.

It should be understood that a device with a communication function in a network/system in the implementations of the present application may be referred to as a communication device. Taking the communication system 100 shown in FIG. 1 as an example, communication devices may include a network device 110 and a terminal device 120 which have a communication function, and the network device 110 and the terminal device 120 may be the specific devices described above, which will not be repeated here. The communication devices may also include other devices in the communication system 100, e.g., other network entities such as a network controller, a mobile management entity, or the like, which is not limited in the implementations of the present application.

An unlicensed spectrum is a spectrum classified by countries and regions and available to communication of radio devices. The spectrum may be regarded as a shared spectrum, that is, communication devices in different communication systems may use the spectrum and may not apply for exclusive spectrum authority from the government, as long as they meet the regulatory requirements set by countries or regions on the spectrum. In order to enable various communication systems using the unlicensed spectrum for wireless communication to coexist amicably on the spectrum, the communication devices may follow a LBT principle when communicating on unlicensed.

With the development of wireless communication technology, the NR system may deploy a network on the unlicensed spectrum to use the unlicensed spectrum for a data service transmission.

For the NR-U system which deploys the network on the unlicensed spectrum, a dual connectivity or independent network deployment scenario may be supported, so a terminal device needs to send a random access preamble sequence on an NR-U carrier, for example, the terminal device accesses a network through the NR-U carrier. A mode which can realize that a terminal device sends a PRACH through an NR-U carrier is provided below.

FIG. 2 is a schematic flow chart of a communication method 200 according to an implementation of the present application. The method 200 may be performed by a terminal device, and may include at least part of following contents.

It should be noted that the technical solution of the method 200 may be applied not only to communication on an unlicensed spectrum, but also to other communication scenarios, such as a communication scenario on a licensed spectrum.

In 210, the terminal device acquires a target Physical Random Access Channel (PRACH) resource set.

Herein, the target PRACH resource set may include at least one resource set of a first PRACH resource set and a second PRACH resource set, and at least one resource of the first PRACH resource set and at least one resource of the second PRACH resource set are different.

Optionally, a PRACH resource may include at least one of a time domain resource, a frequency domain resource and a code domain resource which are used for sending a PRACH.

Optionally, at least one resource of the first PRACH resource set and at least one resource of the second PRACH resource set are different, which includes: a time domain position of at least one first PRACH resource in the first PRACH resource set is different from a time domain position of at least one second PRACH resource in the second PRACH resource set, and/or a frequency domain position of at least one first PRACH resource in the first PRACH resource set is different from a frequency domain position of at least one second PRACH resource in the second PRACH resource set.

Optionally, in an implementation of the present application, a network device may determine the first PRACH resource set and the second PRACH resource set. When the terminal device is in an idle state, the terminal device may acquire the first PRACH resource set determined by the network device; and when the terminal device is in a connected state, the terminal device may acquire the first PRACH resource set and/or the second PRACH resource set determined by the network device.

That is to say, when the terminal device is in an idle state, the terminal device may send a random access preamble sequence through a PRACH resource in the first PRACH resource set. For example, when the terminal device performs initial access, a PRACH resource in the first PRACH resource set is available to sending a PRACH by the terminal device. In another example, when the terminal device needs to re-establish a Radio Resource Control (RRC) connection after a radio link fails, a PRACH resource in the first PRACH resource set is available to sending a PRACH by the terminal device.

In another case, when the terminal device is in a connected state, the terminal device may send a random access preamble sequence through a PRACH resource in the first PRACH resource set or the second PRACH resource set. For example, a PRACH resource in the first PRACH resource set and/or the second PRACH resource set may be used for sending a PRACH by the terminal device, when an event by which the terminal device triggers PRACH sending includes at least one of following: the terminal device is in an RRC connected state and needs to be switched from a serving cell to a target cell; or, the terminal device is in an RRC connected state, but uplink synchronization is not realized, and at this time, the terminal device sends uplink data or receives downlink data; or, the terminal device is switched from an RRC inactive state to an RRC connected state; or, the terminal device is in an RRC connected state, and at this time, a synchronization process needs to be performed, but the terminal device has no Time Alignment (TA).

Or, the terminal device requests for Other System Information (OSI).

Or, the terminal device needs to recover a Beam failure.

It should be understood that in an implementation of the present application, the terms "first" and "second" are only for distinguishing between different objects, but do not constitute a limitation on the scope of the implementation of the present application.

It should be further understood that in an implementation of the present application, the term "and/or" is merely an association relationship describing associated objects, indicating that there may be three relationships, for example, A and/or B may indicate these three cases: A alone, both A and B, and B alone. In addition, the symbol "/" herein generally indicates that objects before and after the symbol "/" have an "or" relationship.

In an implementation of the present application, there are multiple implementations for the terminal device to acquire at least one resource set of the first PRACH resource set and the second PRACH resource set, which are described below respectively.

In a first implementation, when the target PRACH resource set includes the second PRACH resource set, the terminal device acquires the target PRACH resource set, which may include: the terminal device receives first indication information sent by the network device, wherein the first indication information may be used for determining a second PRACH resource set configuration within a first time period, and then the terminal device may determine the second PRACH resource set within the first time period according to the second PRACH resource set configuration within the first time period.

Optionally, the network device may determine the second PRACH resource set configuration within the first time period according to a to-be-transmitted subframe/time slot ratio, and then may send the first indication information to the terminal device.

It should be understood that after the network device preempts a channel, a time unit when the network device sends the first indication information is not specifically limited in an implementation of the present application, that is, the network device may send the first indication information to the terminal device at any time unit when the channel is preempted. As shown in FIG. 3, the network device sends the first indication information to the terminal device at a first time unit when the channel is preempted.

Optionally, the time unit mentioned here may be a subframe, a time slot, a symbol or a Short Transmission Timing Interval (sTTI).

Optionally, the terminal device may receive, on an unlicensed spectrum or on a licensed spectrum, the first indication information sent by the network device, which is not limited in an implementation of the present application.

Optionally, the first indication information may be borne in physical layer signaling. For example, the first indication information may be borne in Downlink Control Information (DCI). In another example, the first indication information may be borne in a Common Physical Downlink Control Channel (PDCCH). In a further example, the first indication information may be subframe/time slot ratio indication information.

Optionally, the first indication information is used for determining a second PRACH resource set configuration within a first time period, which may include: the first indication information explicitly indicates the second PRACH resource set configuration within the first time period.

Optionally, the first indication information is used for determining a second PRACH resource set configuration within a first time period, which may include: the first indication information implicitly indicates the second PRACH resource set configuration within the first time period. For example, the first indication information may indicate another parameter, after receiving the first indication information, the terminal device may determine the second PRACH resource set configuration within the first time period according to another parameter indicated by the first indication information.

Optionally, the second PRACH resource set configuration may include, but is not limited to, at least one of following: a time domain position of at least one second PRACH resource in the second PRACH resource set within the first time period; a frequency domain position of at least one second PRACH resource in the second PRACH resource set within the first time period; an association relationship between at least one second PRACH opportunity in the second PRACH resource set within the first time period and a Synchronization Signal Block (SSB); information of whether the second PRACH resource set is included within the first time period; or, a length of the first time period in time domain.

Herein, the least one second PRACH resource in the second PRACH resource set within the first time period is available to PRACH sending.

Herein, the SSB may include a Primary Synchronization Signal (PSS), a Secondary Synchronization Signal (SSS), and a Physical broadcast channel (PBCH).

Optionally, the time domain position of the second PRACH resource may be understood as a position of a time unit where the second PRACH resource locates. For example, the second PRACH resource is on a 4th time slot and a 5th time slot within the first time period in time domain.

Optionally, the association relationship between the at least one second PRACH opportunity in the second PRACH resource set within the first time period and the SSB may refer to an association relationship between the second PRACH opportunity within the first time period and an SSB index, and the terminal device may determine, according to an index corresponding to a detected SSB, a PRACH transmission opportunity of the SSB within the first time period.

Optionally, the second PRACH opportunity may be understood as at least one of a time domain resource and a frequency domain resource which are used for transmitting a PRACH.

In certain cases, the second PRACH opportunity may be equivalent to the second PRACH resource.

Optionally, the terminal device may determine the second PRACH opportunity within the first time period according to the association relationship between the second PRACH opportunity within the first time period and the SSB and the SSB.

Specifically, as an example, when the network device sends multiple SSBs to the terminal device, the terminal device may randomly select one SSB from the multiple SSBs, and then determine the second PRACH opportunity within the first time period according to the association relationship between the SSB and the second PRACH opportunity within the first time period.

As another example, when the network device sends multiple SSBs to the terminal device, the terminal device may measure a channel quality for the multiple SSBs, then select an SSB with a best channel quality from the multiple SSBs according to measurement results, and then determine the second PRACH opportunity according to the association relationship between the SSB and the second PRACH opportunity within the first time period.

Optionally, a measurement amount of a measurement of the SSB by the terminal device may include, but is not limited to, a reference signal received power (RSRP), a reference signal receiving quality (RSRQ) and a reference signal-signal to interference plus noise ratio (RS-SINR).

For example, the terminal device receives SSB1 and SSB2 sent by the network device. The SSB1 corresponds to PRACH1, and the SSB2 corresponds to PRACH2. The terminal device measures the RSRP of the SSB1 and the SSB2 respectively. Measurement results show that the RSRP of the SSB1 is greater than that of the SSB2, then the terminal device may select the PRACH2 corresponding to the SSB1.

Optionally, the association relationship between the second PRACH opportunity within the first time period and the SSB may be a one-to-one correspondence relationship, that is, one second PRACH opportunity within the first time period corresponds to one SSB. Or, Optionally, the association relationship between the second PRACH opportunity within the first time period and the SSB may be a one-to-many relationship, that is, one second PRACH opportunity within the first time period corresponds to multiple SSBs. For example, 64 random access preamble sequences may be included through code division on one second PRACH opportunity within the first time period, and the second PRACH opportunity corresponds to 4 SSBs, wherein SSB0 corresponds to random access preamble sequences 0 to 15, SSB1 corresponds to random access preamble sequences 16 to 31, SSB2 corresponds to random access preamble sequences 32 to 47, and SSB3 corresponds to random access preamble sequences 48 to 63. Or, Optionally, the association relationship between the second PRACH opportunity within the first time period and the SSB may be a many-to-one relationship, that is, multiple second PRACH opportunities within the first time period correspond to one SSB. For example, the first time period includes four second PRACH opportunities, and the four second PRACH opportunities correspond to two SSBs, wherein a first PRACH opportunity and a second PRACH opportunity within the first time period correspond to SSB0, and a third PRACH opportunity and a fourth PRACH opportunity within the first time period correspond to SSB1.

Optionally, in an implementation of the present application, a starting time unit of the first time period may be sent to the terminal device by the network device.

As an example, the first indication information may also be used for determining an offset of the starting time unit of the first time period relative to a time unit when the terminal device receives the first indication information.

For example, the first indication information may indicate the above offset. Specifically, the terminal device receives the first indication information at a time unit n, then the starting time unit of the first time period is n+k, wherein k is the offset mentioned by the above content.

Optionally, the starting time unit of the first time period may be preset or configured by the network device through higher layer signaling, or the offset of the starting time unit of the first time period relative to the time unit when the terminal device receives the first indication information may be preset or configured by the network device through higher layer signaling. For example, it may be stipulated in a protocol that there is an interval of 3 time units between the starting time unit of the first time period and the time unit when the terminal device receives the first indication information.

In a second implementation, when the target PRACH resource set includes the second PRACH resource set, the terminal device acquires the target PRACH resource set, which may include: the terminal device receives second indication information sent by the network device, wherein the second indication information may be used for determining a second PRACH resource set configuration, and then the terminal device may determine the second PRACH resource set according to the second PRACH resource set configuration.

Optionally, the second indication information may be borne in RRC signaling. That is, the second PRACH resource set may be semi-statically configured.

Optionally, the second PRACH resource set includes second PRACH resources that occur periodically.

Optionally, the second indication information is used for determining a second PRACH resource set configuration, which may include: the first indication information explicitly indicates the second PRACH resource set configuration. Or, The second indication information is used for determining a second PRACH resource set configuration, which may include: the second indication information implicitly indicates the second PRACH resource set configuration. For example, the second indication information may indicate another parameter, and after receiving the second indication information, the terminal device may determine the second PRACH resource set configuration according to another parameter indicated by the second indication information.

Optionally, the second PRACH resource set configuration may include, but is not limited to, at least one of following: a time domain position of at least one second PRACH resource in the second PRACH resource set; a frequency domain position of at least one second PRACH resource in the second PRACH resource set; an association relationship between at least one second PRACH opportunity in the second PRACH resource set and an SSB; or a second PRACH resource period of at least one second PRACH resource in the second PRACH resource set.

In this implementation, optionally, the method may further include: the terminal device receives third indication information sent by the network device. Herein, the third indication information is available to indicating whether at least one second PRACH resource in the second PRACH resource set is available to PRACH sending.

Optionally, the third indication information may be borne in physical layer signaling, for example, the third indication information may be borne in DCI.

Optionally, the third indication information may explicitly indicate whether at least one second PRACH resource in the second PRACH resource set is available to PRACH sending, or the third indication information may implicitly indicate whether at least one second PRACH resource in the second PRACH resource set is available to PRACH sending.

Optionally, the third indication information may be borne in RRC signaling.

As an example, the third indication information may indicate, through at least one bit, whether a second PRACH resource in the second PRACH resource set is available to PRACH sending.

In an example, the third indication information may indicate, through a bit "1", that a second PRACH resource in the second PRACH resource set is available to PRACH sending, and indicate, through a bit "0", that a second PRACH resource in the second PRACH resource set is not used for PRACH sending.

Further illustratively, a quantity of bits of the third indication information may be multiple. If the multiple bits are same, it indicates that a second PRACH resource in the second PRACH resource set is available to PRACH sending; and if at least two of the multiple bits are different, it indicates that a second PRACH resource in the second PRACH resource set is not used for PRACH sending. For example, "000" indicates that a second PRACH resource in the second PRACH resource set is available to PRACH sending, and "010" indicates that a second PRACH resource in the second PRACH resource set is not used for PRACH sending.

It should be understood that specific examples in the implementations of the present application are only intended to help those skilled in the art to better understand the implementations of the present disclosure, but are not intended to limit the scope of the implementations of the present application.

As another example, the third indication information may indicate, through a first parameter, whether a second PRACH resource in the second PRACH resource set is available to PRACH sending.

Illustratively, if the third indication information includes the first parameter, it indicates that a second PRACH resource in the second PRACH resource set is available to PRACH sending; and if the third indication information does not include the first parameter, it indicates that a second PRACH resource in the second PRACH resource set is not used for PRACH sending.

It should be noted that the first parameter is not specifically limited in the implementations of the present application, and any parameter that may indicate whether a second PRACH resource in the second PRACH resource set is available to PRACH sending is included within the protection scope of the present application.

As another example, the third indication information may include activation signaling, wherein the activation signaling is used for indicating that a second PRACH resource in the second PRACH resource set is available to PRACH sending; and/or the third indication information may include deactivation signaling, wherein the deactivation signaling may be used for indicating that a second PRACH resource in the second PRACH resource set is not used for PRACH sending.

Optionally, when the third indication information includes activation signaling but does not include deactivation signaling, the third indication information may indicate, through the activation signaling, that a second PRACH resource in the second PRACH resource set is available to PRACH sending, and indicate, through at least one bit or a first parameter, that a second PRACH resource in the second PRACH resource set is not used for PRACH sending.

Optionally, when the third indication information includes deactivation signaling but does not include activation signaling, the third indication information may indicate, through at least one bit or a first parameter, that a second PRACH resource in the second PRACH resource set is available to PRACH sending, and indicate, through the deactivation signaling, that a second PRACH resource in the second PRACH resource set is not used for PRACH sending.

Optionally, when the third indication information includes activation signaling and deactivation signaling, the third indication information may indicate, through the activation signaling, that a second PRACH resource in the second PRACH resource set is available to PRACH sending, and indicate, through the deactivation signaling, that a second PRACH resource in the second PRACH resource set is not used for PRACH sending.

Optionally, the activation signaling and the deactivation signaling are transmitted in a same DCI format. As an example, the DCI format includes an N-bit activation signaling field. When any of the N bits is 1, it indicates activating the second PRACH resource set (i.e., a second PRACH resource in the second PRACH resource set is available to PRACH sending), and when any of the N bits is 0, it indicates deactivating the second PRACH resource set (i.e., a second PRACH resource in the second PRACH resource set is not available to PRACH sending). Herein, N is a positive integer.

Optionally, in an implementation of the present application, effective time of the activation signaling or the deactivation signaling may be preset or indicated by the network device to the terminal device through signaling. For example, the network device configures the effective time of the activation signaling to be p time units through higher layer signaling, and the terminal device receives the activation signaling at a time unit n, then second PRACH resources in the second PRACH resource set that occur at a time unit n+p and time units thereafter are available to PRACH sending. In another example, the network device configures the effective time of the deactivation signaling to be q time units through higher layer signaling, and the terminal device receives the activation signaling at a time unit n, then second PRACH resources in the second PRACH resource set that occur at a time unit n+q and time units thereafter are not available to PRACH sending.

It should be noted that, in the implementation, the association relationship between at least one second PRACH opportunity in the second PRACH resource set and an SSB may refer to an association relationship between all second PRACH opportunities in the semi-statically configured second PRACH resource set and an SSB index, but an association relationship between a second PRACH opportunity which is actually effective and an SSB index is an association relationship, which is indicated by the third indication information received by the terminal device, between a second PRACH opportunity available to sending a PRACH and an SSB index.

For example, the second PRACH resource set includes three second PRACH opportunities. The second PRACH opportunity 1 is in a time slot 1, the second PRACH opportunity 2 is in a time slot 5, and the second PRACH opportunity 3 is in a time slot 9, wherein the second PRACH opportunity 1 corresponds to SSB1, the second PRACH opportunity 2 corresponds to SSB2, and the third PRACH opportunity 3 corresponds to SSB3. The network device configures the effective time of activation signaling to be three time slots through higher layer signaling, and the terminal device receives the activation signaling on a time slot 2, then the second PRACH opportunities on a time slot 5 and time slots thereafter are activated, that is, the association relationship between the second PRACH opportunity which is actually effective and the SSB index includes an association relationship between the second PRACH opportunity 2 and the SSB2 and an association relationship between the third PRACH opportunity 3 and the SSB3.

An implementation in which the terminal device determines the second PRACH opportunity according to the association relationship between the second PRACH opportunity which is actually effective and the SSB index may refer to the implementation of the terminal device according to the association relationship between the second PRACH opportunity within the first time period and the SSB index, which will not be repeated here.

In a third implementation, when the target PRACH set includes the first PRACH resource set, the terminal device acquires the target PRACH resource set, which may include: the terminal device receives fourth indication information sent by the network device, wherein the fourth indication information is used for determining a first PRACH resource set configuration. After determining the first PRACH resource set configuration, the terminal device may determine the first PRACH resource set according to the first PRACH resource set configuration.

Optionally, the fourth indication information may be borne in RRC signaling. That is, the first PRACH resource set may be semi-statically configured.

Optionally, the first PRACH resource set includes first PRACH resources that occur periodically.

Optionally, the fourth indication information is used for determining a first PRACH resource set configuration, which may include: the fourth indication information explicitly indicates the first PRACH resource set configuration. Or The fourth indication information is used for determining a first PRACH resource set configuration, which may include: the fourth indication information implicitly indicates the first PRACH resource set configuration. For example, the fourth indication information may indicate another parameter, and after receiving the fourth indication information, the terminal device may determine the first PRACH resource set configuration according to another parameter indicated by the fourth indication information.

Optionally, the first PRACH resource set configuration may include, but is not limited to, at least one of following: a time domain position of at least one first PRACH resource in the first PRACH resource set; a frequency domain position of at least one first PRACH resource in the first PRACH resource set; an association relationship between at least one first PRACH opportunity in the first PRACH resource set and an SSB; or a first PRACH resource period of at least one first PRACH resource in the first PRACH resource set.

Optionally, the time domain position of the first PRACH resource may be understood as a position of a time unit where the first PRACH resource locates. For example, the first PRACH resource is on a time slot #3 in time domain.

Optionally, the time domain position of the first PRACH resource may include a starting position of the time unit where the first PRACH resource locates. For example, the starting position of the first PRACH resource in time domain is a second symbol in a time slot #3.

Optionally, the first PRACH opportunity may be understood as at least one of a time domain resource and a frequency domain resource for transmitting a PRACH.

Optionally, the association relationship between at least one first PRACH opportunity in the first PRACH resource set and an SSB, which may refer to an association relationship between a first PRACH opportunity and an SSB index, and the terminal device may determine, according to an index corresponding to a detected SSB, a PRACH transmission opportunity of the SSB.

Optionally, the association relationship between a first PRACH opportunity and an SSB is the same as that between a semi-statically configured second PRACH opportunity and an SSB.

Optionally, the terminal device may determine the first PRACH opportunity according to the association relationship between the first PRACH opportunity and the SSB and the SSB. It should be understood that an implementation in which the terminal device determines the first PRACH opportunity according to the association relationship between the first PRACH opportunity and the SSB and the SSB may refer to the implementation in which the terminal device determines the second PRACH opportunity according to the association relationship between the semi-statically configured second PRACH opportunity and the SSB and the SSB, which will not be described too much here for the sake of brevity.

In the implementation of the present application, optionally, the first PRACH resource period is greater than the second PRACH resource period. Further optionally, the second PRACH resource may include the first PRACH resource.

For example, the first PRACH resource period is 20 ms, and the second PRACH resource period is 5 ms.

According to the above technical solution, no matter where the semi-statically configured first PRACH resource is in one transmission opportunity, the resource is to be reserved for a PRACH transmission, which will greatly reduce flexibility of subframe/time slot ratio. In an implementation of the present application, the first PRACH resource period is greater than the second PRACH resource period, which may reduce influence of the semi-statically configured first PRACH resource on a downlink transmission by the network device after preempting a channel, so that flexibility of subframe/time slot ratio may be improved.

When the second PRACH resource set is semi-statically configured, optionally, the network device may send identity information to the terminal device, wherein the identity information is available to distinguishing between the first PRACH resource set configuration and the second resource set configuration.

Optionally, the second indication information and the fourth indication information sent by the network device to the terminal device may carry identity information for distinguishing between the first PRACH resource set configuration and the second resource set configuration.

When the second PRACH resource set is semi-statically configured, optionally, the first PRACH resource set configuration and the second resource set configuration may be distinguished by a preset rule. For example, the preset rule is that the first PRACH resource period is greater than the second PRACH resource period. After receiving two PRACH resource set configurations, the terminal device may determine that in the two PRACH resource set configurations, the PRACH resource set configuration with a longer period is the first PRACH resource set configuration, and the PRACH resource set configuration with a shorter period is the second PRACH resource set configuration.

In this way, when the first PRACH resource set configuration and the second PRACH resource set configuration are both semi-static configurations, the terminal device may distinguish between the first PRACH resource set configuration and the second PRACH resource set configuration.

The method for acquiring a PRACH resource set by a terminal device will be described by way of example with reference to FIG. 3 and FIG. 4. The second PRACH resource set in FIG. 3 is dynamically configured. A block in FIG. 3 represents a time slot. It may be seen that the first PRACH resource period is 20 time slots. After preempting a channel for the first time, the network device sends DCI to the terminal device in a first time slot after preempting the channel to indicate a time domain position of the second PRACH resource set to the terminal device. It may be seen that the network device sends DCI to the terminal device in a time slot n, and time domain positions of the second PRACH resources are a time slot n+5, a time slot n+6 and a time slot n+7. After preempting a channel for the second time, the network device sends DCI to the terminal device in a first time slot m after preempting the channel to indicate to the terminal device that the time domain position of the second PRACH resource is a time slot m+8. Since a seventh time slot on which the network device performs a downlink transmission is a time slot of the first PRACH resource, the network device needs to skip the first PRACH resource during performing the downlink transmission.

In FIG. 4, the second PRACH resource set is semi-statically configured. A block in FIG. 4 represents a time slot. It may be seen that the first PRACH resource period is 20 time slots, the second PRACH resource period is 10 time slots, and the second PRACH resource period is smaller than the first PRACH resource period. The network device preempts a channel for the first time in a time slot n, and sends activation signaling to the terminal device in the time slot n, wherein effective time of the activation signaling is 4 time slots, then second PRACH resources on a time slot n+4 and time slots thereafter are activated, at which time, second PRACH resources on time slots n+9 and n+19 are available to PRACH sending, and the second PRACH resource on a time slot n−1 is not used for PRACH sending. The network device preempts a channel for the second time in a time slot n+11, and sends deactivation signaling to the terminal device in the time slot n+11, wherein effective time of the deactivation signaling is 4 time slots, then the second PRACH resources on a time slot n+15 and time slots thereafter are not used for PRACH sending. At this time, the second PRACH resource on the time slot n+19 is not used for PRACH sending. Since a seventh time slot on which the network device performs a downlink transmission is a time slot of the first PRACH resource, the network device needs to skip the first PRACH resource during performing the downlink transmission.

In 220, the terminal device determines a target PRACH resource from the target PRACH resource set.

Herein, the target PRACH resource may be used for PRACH sending by the terminal device in a random access procedure on an unlicensed spectrum.

In a possible implementation, if the terminal device is in an idle state, the terminal device may determine at least one first PRACH resource as the target PRACH resource.

As an example, the terminal device may select, from at least one first PRACH resource, a corresponding PRACH resource as the target PRACH resource according to an SSB measurement result.

As another example, the terminal device may determine the target PRACH resource according to a time domain position of at least one first PRACH resource.

Optionally, the terminal device may determine a PRACH resource closest to a time domain position where the fourth indication information is received as the target PRACH resource.

For example, the first PRACH resource includes PRACH resource 1, PRACH resource 2 and PRACH resource 3, the time unit where the PRACH resource 1 locates is a subframe 2, the time units where the PRACH resource 2 locates are a subframe 4 and a subframe 5, and the time unit where the PRACH resource 3 locates is a subframe 8, and the terminal device receives the fourth indication information in a subframe 7, then the terminal device may determine the PRACH resource 3 as the target PRACH resource.

As another example, the terminal device may determine the target PRACH resource according to an occupation condition of at least one first PRACH resource in an entire resource pool.

Optionally, the terminal device may determine a PRACH resource, in the at least one first PRACH resource, with a largest occupation proportion in the entire resource pool as the target PRACH resource.

As another example, the terminal device may determine the target PRACH resource according to a signal strength of an SSB.

Optionally, the terminal device may determine a PRACH resource corresponding to the SSB with a highest signal strength as the target PRACH resource.

In another possible implementation, if the terminal device is in a connected state, the terminal device may determine at least one first PRACH resource or at least one second PRACH resource as the target PRACH resource.

An implementation of determining the target PRACH resource when the terminal device is in a connected state may refer to the implementation of determining the target PRACH resource when the terminal device is in an idle state, which will not be repeated here.

After the terminal device determines the target PRACH resource and a result of channel sensing is that the channel is idle, a PRACH may be sent on the target PRACH resource.

According to the technical solution of an implementation of the present application, the terminal device determines, from the acquired at least one resource set, a target PRACH resource for transmitting a PRACH on an unlicensed spectrum, so that a transmission of a PRACH on an NR-U carrier may be realized.

FIG. 5 is a schematic flow chart of a communication method 500 according to an implementation of the present application. The method 500 may be performed by a network device and may include at least part of following contents.

It should be noted that the technical solution of the method 500 may be applied not only to communication on an unlicensed spectrum, but also to other communication scenarios, such as a communication scenario on a licensed spectrum.

In 510, the network device determines a first PRACH resource set and a second PRACH resource set. Herein, at least one resource of the first PRACH resource set and at least one resource of the second PRACH resource set are different.

In 520, the network device detects a random access preamble sequence on a first PRACH resource in the first PRACH resource set and at least one second PRACH resource in the second PRACH resource set.

Optionally, the method may further include: the network device sends first indication information to the terminal device, wherein the first indication information may be used for determining a second PRACH resource set configuration within the first time period.

Optionally, the second PRACH resource set configuration within the first time period includes at least one of following: a time domain position of at least one second PRACH resource in the second PRACH resource set within the first time period; a frequency domain position of at least one second PRACH resource in the second PRACH resource set within the first time period; an association relationship between at least one second PRACH opportunity in the second PRACH resource set within the first time period and a Synchronization Signal Block (SSB); information of whether the second PRACH resource set is included within the first time period; or a length of the first time period in time domain.

Optionally, the first indication information may be borne in physical layer signaling. Optionally, the first indication information may also be used for indicating an offset of a starting time unit of the first time period relative to a time unit when the network device sends the first indication information.

Optionally, the method may further include: the network device sends second indication information to the terminal device, wherein the second indication information may be used for determining a second PRACH resource set configuration.

Optionally, the second PRACH resource set configuration may include at least one of following: a time domain position of at least one second PRACH resource in the second PRACH resource set; a frequency domain position of at least one second PRACH resource in the second PRACH resource set; an association relationship between at least one second PRACH opportunity in the second PRACH resource set and an SSB; or a second PRACH resource period of at least one second PRACH resource in the second PRACH resource set.

Optionally, the second indication information is borne in RRC signaling.

Optionally, the method may further include: the network device sends third indication information to the terminal device, wherein the third indication information is used for indicating whether at least one second PRACH resource in the second PRACH resource set is available to PRACH sending.

Optionally, the third indication information is borne in physical layer signaling.

Optionally, the third indication information may include activation signaling, wherein the activation signaling is used for indicating that at least one second PRACH resource in the second PRACH resource set is available to PRACH sending; and/or the third indication information may include deactivation signaling, wherein the deactivation signaling is used for indicating that at least one second PRACH resource in the second PRACH resource set is not used for PRACH sending.

Optionally, the method may further include: the network device sends fourth indication information to the terminal device, wherein the fourth indication information is used for determining a first PRACH resource set configuration.

Optionally, the first PRACH resource set configuration may include at least one of following: a time domain position of at least one first PRACH resource in the first PRACH resource set; a frequency domain position of at least one first PRACH resource in the first PRACH resource set; an association relationship between at least one first PRACH opportunity in the first PRACH resource set and an SSB; or a first PRACH resource period of at least one first PRACH resource in the first PRACH resource set.

Optionally, the fourth indication information is borne in RRC signaling.

Optionally, the first PRACH resource period is greater than the second PRACH resource period, wherein the first PRACH resource period is a period of at least one first PRACH resource in the first PRACH resource set, and the second PRACH resource period is a period of at least one second PRACH resource in the second PRACH resource set.

It should be understood that although methods 200 and 500 are separately described above, this does not mean that the methods 200 and 500 are independent, instead, cross reference may be made between the description of the methods. Optional solutions of various methods may be used in combination in a case that there is no conflict. For example, the description in the method 200 may be applied to the method 500.

It should be understood that in various implementations of the present application, sequence numbers of the above various processes do not imply an order of execution of the various processes, which should be determined by their functions and internal logics, and should not constitute any limitation on implementation processes of the implementations of the present application.

The communication methods according to the implementations of the present application have been described in detail above, next, a communication apparatus according to an implementation of the present application will be described with reference to FIGS. 6 to 8. The technical features described in the method implementations are applicable to a following apparatus implementation.

Figure 6:
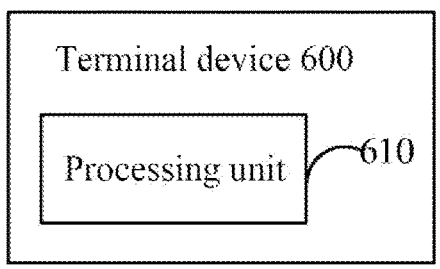
FIG. 6 is a schematic block diagram of a terminal device according to an implementation of the present application.

FIG. 6 shows a schematic block diagram of a terminal device 600 according to an implementation of the present application. As shown in FIG. 6, the terminal device 600 includes a processing unit 610.

The processing unit 610 is configured to acquire a target PRACH resource set, wherein the target PRACH resource set includes at least one resource set of a first PRACH resource set and a second PRACH resource set, and at least one resource of the first PRACH resource set and at least one resource of the second PRACH resource set are different.

The processing unit 610 is further configured to determine a target PRACH resource from the target PRACH resource set, wherein the target PRACH resource is used for PRACH sending in a random access procedure.

Optionally, in an implementation of the present application, when the target PRACH resource set includes the second PRACH resource set, the terminal device 600 further includes a communication unit 620.

The communication unit 620 is configured to receive first indication information sent by a network device, wherein the first indication information is used for determining a second PRACH resource set configuration within a first time period.

The processing unit 610 is specifically configured to determine a second PRACH resource set within the first time period according to the second PRACH resource set configuration within the first time period.

Optionally, in an implementation of the present application, the second PRACH resource set configuration within the first time period includes at least one of following: a time domain position of at least one second PRACH resource in the second PRACH resource set within the first time period; a frequency domain position of at least one second PRACH resource in the second PRACH resource set within the first time period; an association relationship between at least one second PRACH opportunity in the second PRACH resource set within the first time period and an SSB; information of whether the second PRACH resource set is included within the first time period; or a length of the first time period in time domain.

Optionally, in an implementation of the present application, the first indication information is borne in physical layer signaling.

Optionally, in an implementation of the present application, the first indication information is further used for determining an offset of a starting time unit of the first time period relative to a time unit when the terminal device 600 receives the first indication information.

Optionally, in an implementation of the present application, when the target PRACH resource set includes the second PRACH resource set, the terminal device 600 further includes a communication unit 620.

The communication unit 620 is configured to receive second indication information sent by a network device, wherein the second indication information is used for determining a second PRACH resource set configuration.

The processing unit 610 is specifically configured to determine the second PRACH resource set according to the second PRACH resource set configuration.

Optionally, in an implementation of the present application, the second PRACH resource set configuration includes at least one of following: a time domain position of at least one second PRACH resource in the second PRACH resource set; a frequency domain position of at least one second PRACH resource in the second PRACH resource set; an association relationship between at least one second PRACH opportunity in the second PRACH resource set and an SSB; or a second PRACH resource period of at least one second PRACH resource in the second PRACH resource set.

Optionally, in an implementation of the present application, the second indication information is borne in RRC signaling.

Optionally, in an implementation of the present application, the communication unit 620 is further configured to receive third indication information sent by the network device, wherein the third indication information is used for indicating whether at least one second PRACH resource in the second PRACH resource set is available to PRACH sending.

Optionally, in an implementation of the present application, the third indication information is borne in physical layer signaling.

Optionally, in an implementation of the present application, the third indication information includes activation signaling, wherein the activation signaling is used for indicating that at least one second PRACH resource in the second PRACH resource set is available to PRACH sending; and/or the third indication information includes deactivation signaling, wherein the deactivation signaling is used for indicating that at least one second PRACH resource in the second PRACH resource set is not used for PRACH sending.

Optionally, in an implementation of the present application, when the target PRACH resource set includes the first PRACH resource set, the terminal device 600 further includes: a communication unit 620, configured to receive fourth indication information sent by the network device, wherein the fourth indication information is used for determining a first PRACH resource set configuration.

The processing unit 610 is specifically configured to determine the first PRACH resource set according to the first PRACH resource set configuration.

Optionally, in an implementation of the present application, the first PRACH resource set configuration includes at least one of following: a time domain position of at least one first PRACH resource in the first PRACH resource set; a frequency domain position of at least one first PRACH resource in the first PRACH resource set; an association relationship between at least one first PRACH opportunity in the first PRACH resource set and an SSB; or a first PRACH resource period of at least one first PRACH resource in the first PRACH resource set.

Optionally, in an implementation of the present application, the fourth indication information is borne in RRC signaling.

Optionally, in an implementation of the present application, the first PRACH resource period is greater than the second PRACH resource period, wherein the first PRACH resource period is a period of at least one first PRACH resource in the first PRACH resource set, and the second PRACH resource period is a period of at least one second PRACH resource in the second PRACH resource set.

Optionally, in an implementation of the present application, the processing unit 610 is specifically configured to determine at least one first PRACH resource in the first PRACH resource set as the target PRACH resource, if the terminal device 600 is in an idle state; and/or, determine at least one first PRACH resource in the first PRACH resource set or at least one second PRACH resource in the second PRACH resource set as the target PRACH resource, if the terminal device 600 is in a connected state.

It should be understood that the terminal device 600 may correspond to the terminal device in the method 200, and may implement corresponding operations of the terminal device in the method 200, which will not be repeated here for sake of brevity.

Figure 7:
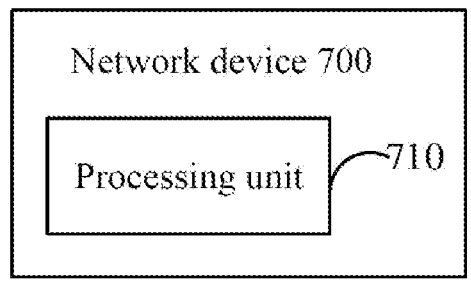
FIG. 7 is a schematic block diagram of a network device according to an implementation of the present application.

FIG. 7 shows a schematic block diagram of a network device 700 according to an implementation of the present application. As shown in FIG. 7, the network device 700 includes a processing unit 710.

The processing unit 710 is configured to determine a first PRACH resource set and a second PRACH resource set, wherein at least one resource of the first PRACH resource set and at least one resource of the second PRACH resource set are different.

The processing unit 710 is further configured to detect a random access preamble sequence on at least one first PRACH resource in the first PRACH resource set and at least one second PRACH resource in the second PRACH resource set.

Optionally, in an implementation of the present application, the network device further includes: a communication unit 720, configured to send first indication information to a terminal device, wherein the first indication information is used for determining a second PRACH resource set configuration within the first time period.

Optionally, in an implementation of the present application, the second PRACH resource set configuration within the first time period includes at least one of following: a time domain position of at least one second PRACH resource in the second PRACH resource set within the first time period; a frequency domain position of at least one second PRACH resource in the second PRACH resource set within the first time period; an association relationship between at least one second PRACH opportunity in the second PRACH resource set within the first time period and an SSB; information of whether the second PRACH resource set is included within the first time period; or a length of the first time period in time domain.

Optionally, in an implementation of the present application, the first indication information is borne in physical layer signaling.

Optionally, in an implementation of the present application, the first indication information is further used for indicating an offset of a starting time unit of the first time period relative to a time unit when the network device 700 sends the first indication information.

Optionally, in an implementation of the present application, the network device further includes: a communication unit 720, configured to send second indication information to the terminal device, wherein the second indication information is used for determining a second PRACH resource set configuration.

Optionally, in an implementation of the present application, the second PRACH resource set configuration includes at least one of following: a time domain position of at least one second PRACH resource in the second PRACH resource set; a frequency domain position of at least one second PRACH resource in the second PRACH resource set; an association relationship between at least one second PRACH opportunity in the second PRACH resource set and an SSB; or a second PRACH resource period of at least one second PRACH resource in the second PRACH resource set.

Optionally, in an implementation of the present application, the second indication information is borne in RRC signaling.

Optionally, in an implementation of the present application, the communication unit 720 is further configured to send third indication information to the terminal device, wherein the third indication information is used for indicating whether at least one second PRACH resource in the second PRACH resource set is available to PRACH sending.

Optionally, in an implementation of the present application, the third indication information is borne in physical layer signaling.

Optionally, in an implementation of the present application, the third indication information includes activation signaling, wherein the activation signaling is used for indicating that at least one second PRACH resource in the second PRACH resource set is available to PRACH sending; and/or the third indication information includes deactivation signaling, wherein the deactivation signaling is used for indicating that at least one second PRACH resource in the second PRACH resource set is not used for PRACH sending.

Optionally, in an implementation of the present application, the network device further includes: a communication unit 720, configured to send fourth indication information to the terminal device, wherein the fourth indication information is used for determining a first PRACH resource set configuration.

Optionally, in an implementation of the present application, the first PRACH resource set configuration includes at least one of following: a time domain position of at least one first PRACH resource in the first PRACH resource set; a frequency domain position of at least one first PRACH resource in the first PRACH resource set; an association relationship between at least one first PRACH opportunity in the first PRACH resource set and an SSB; or a first PRACH resource period of at least one first PRACH resource in the first PRACH resource set.

Optionally, in an implementation of the present application, the fourth indication information is borne in RRC signaling.

Optionally, in an implementation of the present application, the first PRACH resource period is greater than the second PRACH resource period, wherein the first PRACH resource period is a period of at least one first PRACH resource in the first PRACH resource set, and the second PRACH resource period is a period of at least one second PRACH resource in the second PRACH resource set.

It should be understood that the network device 700 may correspond to the network device in method 500, and may implement corresponding operations of the network device in the method 500, which will not be repeated here for the sake of brevity.

Figure 8:
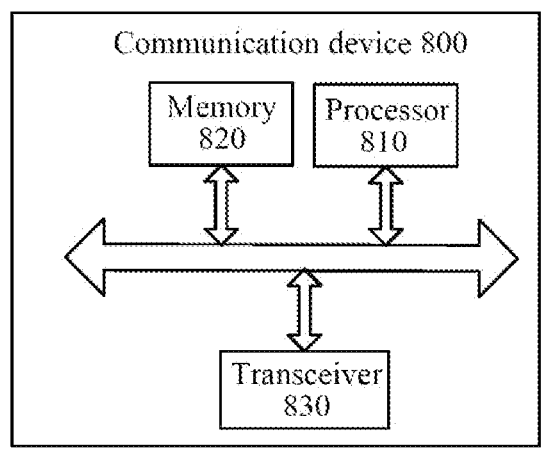
FIG. 8 is a schematic block diagram of a communication device according to an implementation of the present application.

FIG. 8 is a schematic structural diagram of a communication device 800 according to an implementation of the present application. The communication device 800 shown in FIG. 8 includes a processor 810. The processor 810 may call and run a computer program from a memory to implement the method in an implementation of the present application.

Optionally, as shown in FIG. 8, the communication device 800 may further include a memory 820. Herein, the processor 810 may call and run a computer program from the memory 820 to implement the method in an implementation of the present application.

Herein, the memory 820 may be a separate device independent of the processor 810 or may be integrated in the processor 810.

Optionally, as shown in FIG. 8, the communication device 800 may further include a transceiver 830, and the processor 810 may control the transceiver 830 to communicate with another device. Specifically, information or data may be sent to another device, or information or data sent by another device may be received.

Herein, the transceiver 830 may include a transmitter and a receiver. The transceiver 830 may also further include antennas, wherein a quantity of the antennas may be one or more.

Optionally, the communication device 800 may be specifically a network device of an implementation of the present application, and the communication device 800 may implement corresponding processes implemented by the network device in various methods of the implementations of the present application, which will not be repeated here for brevity.

Optionally, the communication device 800 may be specifically a terminal device of an implementation of the present application, and the communication device 800 may implement corresponding processes implemented by the terminal device in various methods of the implementations of the present application, which will not be repeated here for brevity.

Figure 9:
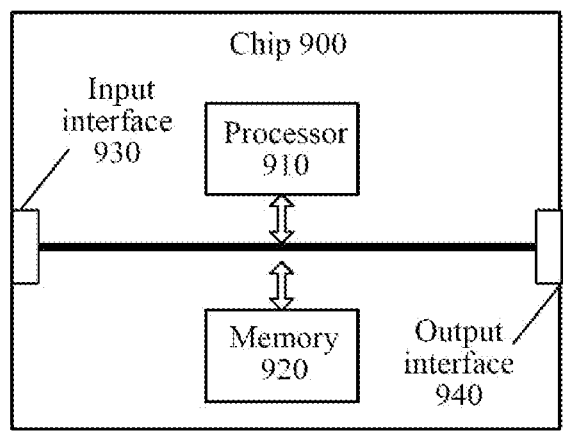
FIG. 9 is a schematic block diagram of a chip according to an implementation of the present application.

FIG. 9 is a schematic structural diagram of a chip according to an implementation of the present application. A chip 900 shown in FIG. 9 includes a processor 910. The processor 910 may call and run a computer program from a memory to implement the method in an implementation of the present application.

Optionally, as shown in FIG. 9, the chip 900 may further include a memory 920. Herein, the processor 910 may call and run a computer program from the memory 920 to implement the method in an implementation of the present application.

Herein, the memory 920 may be a separate device independent of the processor 910, or may be integrated in the processor 910.

Optionally, the chip 900 may further include an input interface 930. Herein, the processor 910 may control the input interface 930 to communicate with another device or chip. Specifically, information or data sent by another device or chip may be acquired.

Optionally, the chip 900 may further include an output interface 940. Herein, the processor 910 may control the output interface 940 to communicate with another device or chip. Specifically, information or data may be outputted to another device or chip.

Optionally, the chip may be applied to a terminal device of an implementation of the present application, and the chip may implement corresponding processes implemented by the terminal device in various methods of the implementations of the present application, which will not be repeated here for brevity.

Optionally, the chip may be applied to a network device of an implementation of the present application, and the chip may implement corresponding processes implemented by the network device in various methods of the implementations of the present application, which will not be repeated here for brevity.

It should be understood that the chip mentioned in the implementation of the present application may also be referred to as a system-level chip, a system chip, a chip system or a system chip-on-chip, etc.

It should be understood that the processor in the implementation of the present application may be an integrated circuit chip having a signal processing capability. In an implementation process, the acts of the foregoing method implementations may be accomplished by an integrated logic circuit of hardware in the processor or instructions in a form of software. The above processor may be a general purpose processor, a Digital Signal Processor (DSP), an Application Specific Integrated Circuit (ASIC), a Field Programmable Gate Array (FPGA) or another programmable logic device, a discrete gate or a transistor logic device, or a discrete hardware component. The methods, acts and logical block diagrams disclosed in the implementations of the present application may be implemented or executed. The general purpose processor may be a microprocessor, or the processor may be any conventional processor or the like. The acts of the methods disclosed with reference to the implementations of the present application may be directly embodied as being executed and accomplished by a hardware decoding processor, or being executed and accomplished by a combination of hardware and software modules in a decoding processor. The software modules may be located in a storage medium commonly used in the art, such as a random memory, a flash memory, a read-only memory, a programmable read-only memory or an electrically erasable programmable memory, or a register, etc. The storage medium is located in a memory, and the processor reads information in the memory to accomplish the acts of the above methods in combination with its hardware.

It may be understood that the memory in the implementation of the present application may be a transitory memory or a non-transitory memory, or may include both a transitory memory and a non-transitory memory. Herein, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. By way of exemplary but not restrictive illustrations, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), or a Direct Rambus RAM (DR RAM). It should be noted that the memories in the systems and the methods described in this document are intended to include, without being limited to, these and any other suitable types of memory.

It should be understood that the foregoing memory is exemplary but not restrictive illustration. For example, the memory in the implementations of the present application may also be a static RAM (SRAM), a dynamic RAM (DRAM), a synchronous DRAM (SDRAM), a double data rate SDRAM (DDR SDRAM), an enhanced SDRAM (ES-DRAM), a synch link DRAM (SLDRAM), or a Direct Rambus RAM (DR RAM), or the like. That is, memories in the implementations of the present application are intended to include, without being limited to, these and any other suitable types of memories.

Figure 10:
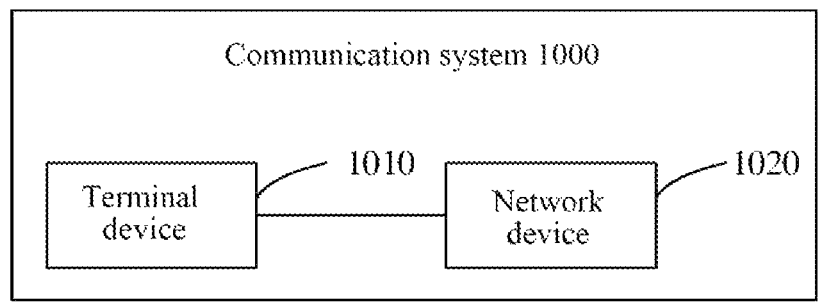
FIG. 10 is a schematic block diagram of a communication system according to an implementation of the present application.

FIG. 10 is a schematic block diagram of a communication system 1000 according to an implementation of the present application. As shown in FIG. 10, the communication system 1000 includes a terminal device 1010 and a network device 1020.

Herein, the terminal device 1010 may be configured to implement corresponding functions implemented by the terminal device in the above-mentioned method, and the network device 1020 may be configured to implement corresponding functions implemented by the network device in the above-mentioned method, which will not be repeated here for brevity.

An implementation of the present application further provides a computer readable storage medium, configured to store a computer program.

Optionally, the computer readable storage medium may be applied to a terminal device of an implementation of the present application, and the computer program causes a computer to perform corresponding processes implemented by the terminal device in various methods of the implementations of the present application, which will not be repeated here for brevity.

Optionally, the computer readable storage medium may be applied to a network device of an implementation of the present application, and the computer program causes a computer to perform corresponding processes implemented by the network device in various methods of the implementations of the present application, which will not be repeated here for brevity.

An implementation of the present application further provides a computer program product, including computer program instructions.

Optionally, the computer program product may be applied to a terminal device of an implementation of the present application, and the computer program instructions cause a computer to perform corresponding processes implemented by the terminal device in various methods of the implementations of the present application, which will not be repeated here for brevity.

Optionally, the computer program product may be applied to a network device of an implementation of the present application, and the computer program instructions cause a computer to perform corresponding processes implemented by the network device in various methods of the implementations of the present application, which will not be repeated here for brevity.

An implementation of the present application further provides a computer program.

Optionally, the computer program may be applied to a terminal device of an implementation of the present application. When being run on a computer, the computer program causes the computer to perform corresponding processes implemented by the terminal device in various methods of the implementations of the present application, which will not be repeated here for brevity.

Optionally, the computer program may be applied to a network device of an implementation of the present application. When being run on a computer, the computer program causes the computer to perform corresponding processes implemented by the network device in various methods of the implementations of the present application, which will not be repeated here for brevity.

Those of ordinary skills in the art may recognize that the exemplary units and algorithm acts described in combination with the implementations disclosed herein can be implemented in electronic hardware, or a combination of computer software and electronic hardware. Whether these functions are performed in hardware or software depends on a specific application and a design constraint condition of the technical solutions. Professional technicians may use different methods to implement the described functions in respect to each particular application, but such implementation should not be considered to be beyond the scope of the present application.

Those skilled in the art may clearly understand that for convenience and conciseness of description, specific working processes of the systems, apparatuses and units described above may refer to the corresponding processes in the aforementioned method implementations, which will not be repeated here.

In several implementations provided by the present application, it should be understood that the disclosed systems, apparatuses and methods may be implemented in other ways. For example, the apparatus implementations described above are only illustrative, for example, the division of the units is only a logical function division, and there may be other division manners in an actual implementation, for example, multiple units or components may be combined or integrated into another system, or some features may be ignored or not executed. On the other hand, mutual coupling or direct coupling or a communication connection shown or discussed may be indirect coupling or a communication connection through some interfaces, apparatuses or units, and may be in electrical, mechanical or other forms.

The units described as separate components may or may not be physically separated, and the component shown as a unit may or may not be a physical unit, i.e., it may be located in one place or may be distributed over multiple network units. Part or all of the units therein may be selected according to an actual need to achieve the purpose of the solution of the implementation.

In addition, various functional units in various implementations of the present application may be integrated in one processing unit, or the various units may be physically present separately, or two or more units may be integrated in one unit.

The functions may be stored in a computer readable storage medium, if realized in a form of software functional units and sold or used as a separate product. Based on this understanding, the technical solution of the present application, in essence, or the part contributing to the prior art, or the part of the technical solution, may be embodied in a form of a software product, wherein the computer software product is stored in a storage medium, and includes a number of instructions for causing a computer device (which may be a personal computer, a server, or a network device, or the like) to perform all or part of the acts of the methods described in various implementations of the present application. However, the aforementioned storage media includes various media which may store program codes, such as a USB flash disk, a removable hard disk, a Read-Only Memory (ROM), a Random Access Memory (RAM), a magnetic disk, or an optical disk, etc.

What are described above are merely specific implementations of the present application, but the protection scope of the present application is not limited thereto. Any variation or substitution that may be easily conceived by any of technicians familiar with the present technical field within the technical scope disclosed by the present application shall all be included within the protection scope of the present application. Therefore, the protection scope of the present application shall be subject to the protection scope of the claims.

What is claimed is:

1. A communication method, comprising:
acquiring, by a terminal device, a target Physical Random Access Channel (PRACH) resource set, wherein the target PRACH resource set comprises at least one resource set of a first PRACH resource set and a second PRACH resource set, and at least one resource of the first PRACH resource set and at least one resource of the second PRACH resource set are different; and
determining, by the terminal device, a target PRACH resource from the target PRACH resource set, wherein the target PRACH resource is used for PRACH sending in a random access procedure;
when the target PRACH resource set comprises the second PRACH resource set, acquiring, by the terminal device, the target Physical Random Access Channel (PRACH) resource set comprises:
receiving, by the terminal device, first indication information sent by a network device, wherein the first indication information is used for determining a second PRACH resource set configuration within a first time period; and
determining, by the terminal device, a second PRACH resource set within the first time period according to the second PRACH resource set configuration within the first time period;
wherein the first time period is one transmission opportunity after the network device preempts a channel following a principle of Listen Before Talk (LBT).

2. The method according to claim 1, wherein the second PRACH resource set configuration within the first time period comprises at least one of following:
a time domain position of at least one second PRACH resource in the second PRACH resource set within the first time period;
a frequency domain position of at least one second PRACH resource in the second PRACH resource set within the first time period;
an association relationship between at least one second PRACH opportunity in the second PRACH resource set within the first time period and a Synchronization Signal Block (SSB);
information of whether the second PRACH resource set is included within the first time period; or
a length of the first time period in time domain.

3. The method according to claim 1, wherein the first indication information is further used for determining an offset of a starting time unit of the first time period relative to a time unit when the terminal device receives the first indication information.

4. A terminal device, comprising:
a processor, configured to acquire a target Physical Random Access Channel (PRACH) resource set, wherein the target PRACH resource set comprises at least one resource set of a first PRACH resource set and a second PRACH resource set, and at least one resource of the first PRACH resource set and at least one resource of the second PRACH resource set are different; wherein
the processor is further configured to determine a target PRACH resource from the target PRACH resource set, wherein the target PRACH resource is used for PRACH sending in a random access procedure;
wherein when the target PRACH resource set comprises the second PRACH resource set, the terminal device further comprises:
a communication unit, configured to receive first indication information sent by a network device, wherein the first indication information is used for determining a second PRACH resource set configuration within a first time period;
the processing unit is specifically configured to:
determine a second PRACH resource set within the first time period according to the second PRACH resource set configuration within the first time period;
wherein the first time period is one transmission opportunity after the network device preempts a channel following a principle of Listen Before Talk (LBT).

5. The terminal device according to claim 4, wherein when the target PRACH resource set comprises the second PRACH resource set, the terminal device further comprises:
a transceiver, configured to receive second indication information sent by a network device, wherein the second indication information is used for determining a second PRACH resource set configuration;
the processor is specifically configured to:
determine the second PRACH resource set according to the second PRACH resource set configuration.

6. The terminal device according to claim 5, wherein the second PRACH resource set configuration comprises at least one of following:
a time domain position of at least one second PRACH resource in the second PRACH resource set;
a frequency domain position of at least one second PRACH resource in the second PRACH resource set;
an association relationship between at least one second PRACH opportunity in the second PRACH resource set and an SSB; or
a second PRACH resource period of at least one second PRACH resource in the second PRACH resource set.

7. The terminal device according to claim 5, wherein the transceiver is further configured to:
receive third indication information sent by the network device, wherein the third indication information is used for indicating whether at least one second PRACH resource in the second PRACH resource set is available to PRACH sending.

8. The terminal device according to claim 7, wherein the third indication information comprises activation signaling, wherein the activation signaling is used for indicating that at least one second PRACH resource in the second PRACH resource set is available to PRACH sending; and/or
the third indication information comprises deactivation signaling, wherein the deactivation signaling is used for indicating that at least one second PRACH resource in the second PRACH resource set is not used for PRACH sending.

9. The terminal device according to claim 5, wherein a first PRACH resource period is greater than a second PRACH resource period, wherein the first PRACH resource period is a period of at least one first PRACH resource in the first PRACH resource set, and the second PRACH resource period is a period of at least one second PRACH resource in the second PRACH resource set.

10. The terminal device according to claim 4, wherein when the target PRACH resource set comprises the first PRACH resource set, the terminal device further comprises:
a transceiver, configured to receive fourth indication information sent by the network device, wherein the fourth indication information is used for determining a first PRACH resource set configuration;
the processor is specifically configured to:
determine the first PRACH resource set according to the first PRACH resource set configuration.

11. The terminal device according to claim 10, wherein the first PRACH resource set configuration comprises at least one of following:
a time domain position of at least one first PRACH resource in the first PRACH resource set;
a frequency domain position of at least one first PRACH resource in the first PRACH resource set;
an association relationship between at least one first PRACH opportunity in the first PRACH resource set and an SSB; or
a first PRACH resource period of at least one first PRACH resource in the first PRACH resource set.

12. The terminal device according to claim 4, wherein the processor is specifically configured to:
determine at least one first PRACH resource in the first PRACH resource set as the target PRACH resource, if the terminal device is in an idle state; and/or,
determine at least one first PRACH resource in the first PRACH resource set or at least one second PRACH resource in the second PRACH resource set as the target PRACH resource, if the terminal device is in a connected state.

13. A network device, comprising:
a processor, configured to determine a first PRACH resource set and a second PRACH resource set, wherein at least one resource of the first PRACH resource set and at least one resource of the second PRACH resource set are different; and
the processor is further configured to detect a random access preamble sequence on at least one first PRACH resource in the first PRACH resource set and at least one second PRACH resource in the second PRACH resource set;
wherein the network device further comprises:
a transceiver, configured to send first indication information to a terminal device, wherein the first indication information is used for determining a second PRACH resource set configuration within a first time period;
wherein the first time period is one transmission opportunity after the network device preempts a channel following a principle of Listen Before Talk (LBT).

14. The network device according to claim 13, wherein the network device further comprises:
the transceiver is configured to send second indication information to the terminal device, wherein the second indication information is used for determining a second PRACH resource set configuration.

15. The network device according to claim 14, wherein the transceiver is further configured to:
send third indication information to the terminal device, wherein the third indication information is used for indicating whether at least one second PRACH resource in the second PRACH resource set is available to PRACH sending.

16. The network device according to claim 15, wherein the third indication information comprises activation signaling, wherein the activation signaling is used for indicating that at least one second PRACH resource in the second PRACH resource set is available to PRACH sending; and/or
the third indication information comprises deactivation signaling, wherein the deactivation signaling is used for indicating that at least one second PRACH resource in the second PRACH resource set is not used for PRACH sending.

17. The network device according to claim 14, wherein a first PRACH resource period is greater than a second PRACH resource period, wherein the first PRACH resource period is a period of at least one first PRACH resource in the first PRACH resource set, and the second PRACH resource period is a period of at least one second PRACH resource in the second PRACH resource set.

18. The network device according to claim 13, wherein the network device further comprises:
the transceiver is configured to send fourth indication information to the terminal device, wherein the fourth indication information is used for determining a first PRACH resource set configuration.

\* \* \* \* \*